(12) United States Patent
Gammon et al.

(10) Patent No.: US 7,935,214 B2
(45) Date of Patent: May 3, 2011

(54) TOUGHENED RESIN FIBER LAMINATES WITH TITANIUM PARTICLES

(75) Inventors: Luther M. Gammon, Auburn, WA (US); Steven G. Lemery, Duvall, WA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 11/935,498

(22) Filed: Nov. 6, 2007

(65) Prior Publication Data
US 2009/0155532 A1 Jun. 18, 2009

(51) Int. Cl.
*D06N 7/06* (2006.01)
(52) U.S. Cl. .................. 156/276; 428/147; 428/407
(58) Field of Classification Search .............. 156/276; 428/147, 407
See application file for complete search history.

(56) References Cited

U.S. PATENT DOCUMENTS

| 2,618,550 | A | * | 11/1952 | Hampel et al. | .................. 75/388 |
| 5,279,879 | A | * | 1/1994 | Takezawa et al. | ............. 428/110 |
| 2004/0086699 | A1 | * | 5/2004 | Schneider | .................. 428/292.1 |

FOREIGN PATENT DOCUMENTS

| WO | PCT/US 2008/081416 | 10/2008 |

* cited by examiner

*Primary Examiner* — Kat Wyrozebski
*Assistant Examiner* — Daniel Lee
(74) *Attorney, Agent, or Firm* — Tung & Associates

(57) ABSTRACT

A composite structure includes at least one resin matrix layer having a resin material and a plurality of fiber elements and a plurality of titanium particles provided in the resin material. A method of toughening a resin matrix layer is also disclosed.

8 Claims, 2 Drawing Sheets

TOUGHENED RESIN FIBER LAMINATES WITH TITANIUM PARTICLES

TECHNICAL FIELD

The disclosure relates to polymer composite structures. More particularly, the disclosure relates to a polymer composite structure having a resin matrix interlayer interfused with titanium particles to "toughen" resin fiber laminates and increase the compression load capacity after sustaining impact damage.

BACKGROUND

Polymer composite materials selected and qualified for various applications, such as with primary structure applications in the manufacture of aircraft, for example and without limitation, may be evaluated for two key mechanical properties: compression-after-impact (CAI) strength and hot-wet compression strength, and more specifically open-hole-compression (OHC) strength. However, the means for increasing a composite material's CAI strength and hot-wet OHC strength have typically been counterproductive to each other. More specifically, traditional particulate interlayer toughening methods using elastomeric or thermoplastic-based polymer particles have been effective for increasing a composite's CAI strength, but not generally effective for simultaneously increasing hot-wet compression strength (e.g., hot-wet OHC) properties and, more typically, result in a tradeoff relationship with one another.

Conventional methods utilized to increase the hot-wet compression strength properties of a polymer composite may involve increasing the resin matrix crosslink density to increase the elastic modulus of the resin or by reducing the water absorption characteristics of the matrix by proper formulation of the resin's specific chemistry. Efforts associated with increasing the matrix crosslink density to increase hot-wet compression strength typically result in a composite having reduced CAI properties.

In the interest of toughening the composite matrix interlayer sufficiently to improve its CAI strength, it will be appreciated that titanium particles are irregularly-shaped (small pieces of Ti sponge) and should provide a mechanical bond within the epoxy, along with the ductility and function of a "blocker" for crack propagation. In view of the foregoing, it would be highly desirable to provide a polymer composite structure having a matrix interlayer which provides the properties of titanium but which does not significantly add to the weight of the overall structure, and also which does not negatively affect the hot-wet compression strength of the matrix interlayer.

SUMMARY

The disclosure is generally directed to a composite structure. An illustrative embodiment of the composite structure includes at least one resin matrix layer having a resin material and a plurality of fiber elements and a plurality of titanium particles provided in the resin material.

The disclosure is further generally directed to a method of toughening a resin matrix layer. An illustrative embodiment of the method includes providing a resin matrix layer having a resin material, providing a plurality of fiber elements in the resin material of the resin matrix layer and providing a plurality of titanium particles in the resin material of the resin matrix layer.

BRIEF DESCRIPTION OF THE ILLUSTRATIONS

DETAILED DESCRIPTION

Figure 1:
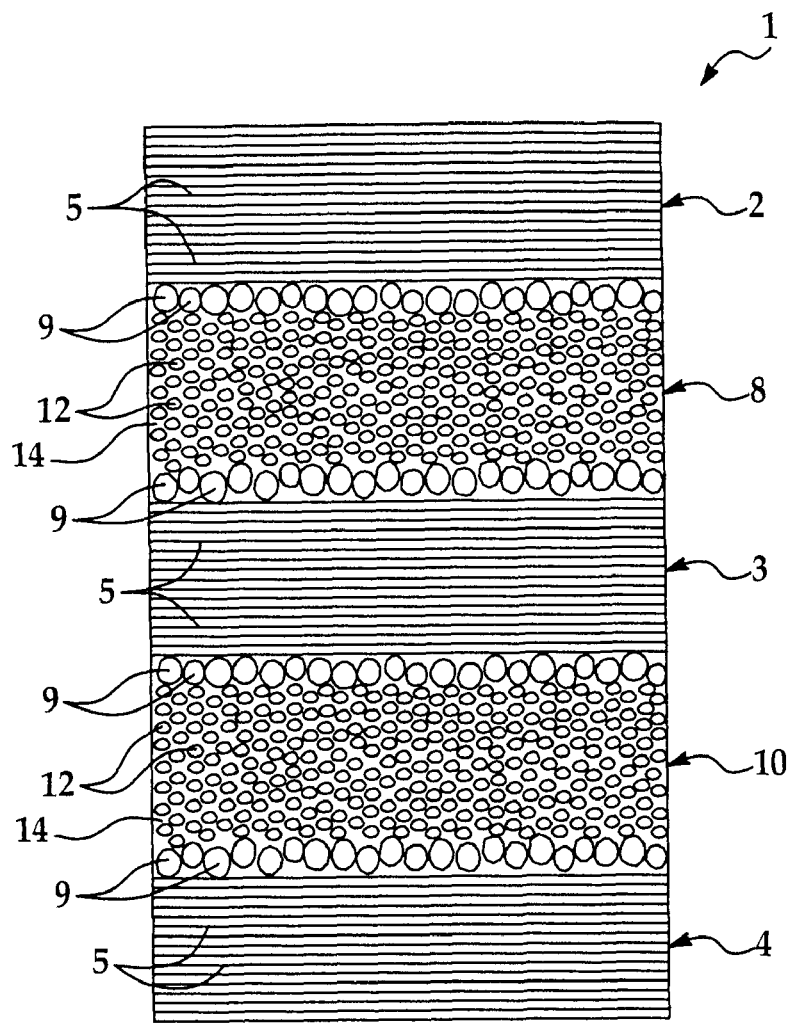
FIG. 1 is a cross-sectional view of a polymer composite structure having a pair of resin matrix interlayers interfused with titanium particles.

Referring to FIG. 1, an illustrative embodiment of a composite structure 1 is shown. The composite structure 1 may include a first fiber layer 2, a second fiber layer 3 and a third fiber layer 4 each of which may include multiple fiber elements or filaments 5. The fiber elements or filaments 5 may be carbon fiber prepreg, for example and without limitation, and may be oriented in generally parallel relationship with respect to each other. The carbon fiber prepreg may be manufactured with carbon filaments that are highly collimated unidirectionally in a tape form and held to tight dimensional tolerances in thickness across the width and length of the composite structure 1. Prior to cure, carbon fibers which are impregnated with resin may be limp and drapable, allowing the tape to conform to part molds.

A first resin matrix interlayer 8 may be interposed between the first fiber layer 2 and the second fiber layer 3. A second resin matrix interlayer 10 may be interposed between the second fiber layer 3 and the third fiber layer 4. The first resin matrix interlayer 8 may bond the first fiber layer 2 to the second fiber layer 3 and the second resin matrix interlayer 10 may bond the second fiber layer 3 to the third fiber layer 4 to form a single, unitary composite structure 1.

Each of the first resin matrix interlayer 8 and the second resin matrix interlayer 10 may include a resin material 14 such as epoxy, for example and without limitation. Multiple fiber elements or filaments 9 may extend through the resin material 14. The fiber elements or filaments 9 may be carbon fiber prepreg, for example and without limitation, and may be oriented in generally parallel relationship with respect to each other and in generally 90-degree relationship with respect to the fiber elements or filaments 5 in each of the first fiber layer 2, the second fiber layer 3 and the third fiber layer 4. It will be appreciated that, the particular arrangement of the fiber elements or filaments 5 in each of the first fiber layer 2, the second fiber layer 3 and the third fiber layer 4 and of the fiber elements or filaments 9 in each of the first resin matrix interlayer 8 and the second resin matrix interlayer 10 may be varied according to the requirements of a particular application and that the arrangement of the fiber elements or filaments 5 and the fiber elements or filaments 9 at a 90 degree angle is only for illustrative purposes.

Titanium particles 12 may be intermixed in the resin material 14 of each of the first resin matrix interlayer 8 and the second resin matrix interlayer 10. The titanium particles 12 may be graded titanium sponge particles, for example and without limitation. The titanium particles 12 may be dispersed generally uniformly throughout the resin material 14 and may be present in the resin material 14 in a quantity of from about 0.3% to about 30% by volume. In some illustrative embodiments, each of the titanium particles 12 may have a diameter of from about 1 to about 90 microns. In some applications, sizes of the titanium particles 12 of about 3~6 microns for unidirectional tape and about 7~10 microns for woven fabric may be beneficial. The titanium particles 12 may be 99~100% commercially-pure Ti sponge derived from the Kroll extraction process and may be graded/screened for size.

The titanium particles 12 may increase the CAI strength of the first resin matrix interlayer 8 and the second resin matrix interlayer 10, serving to toughen the interlayers 8, 10 against microcracking and delamination but without the negative impact of lowering the hot-wet compression strength of the overall polymer composite structure 1. This may be due in part to the fact that the use of the titanium particles 12 may eliminate the need to use elastomeric particles or thermoplastic particles, which may more typically be used to strengthen the composite laminate interlayer but which are known to absorb water in the resin, and therefore result in a reduction in the hot-wet compression strength of the interlayers 8, 10. The titanium particles 12 may not absorb water, and therefore may not negatively impact the hot-wet compression strength of the interlayers 8, 10. The presence of the titanium particles 12 in the interlayers 8, 10 may allow the use of cheaper resin systems by improving the properties of the resin. Due to improvement in the impact resistance of the composite structure 1, fewer plies of carbon-epoxy laminates may be required.

It will also be appreciated that use of the titanium particles 12 as a resin additive may provide the added benefit of serving to disperse the energy of an electric charge, such as from a lightening strike, more evenly throughout the composite structure 1. This may be important in aerospace applications in which the composite structure 1 may be used to form a portion of an aircraft that could experience lightening strike during operation. The titanium particles 12 may effectively serve to spread out or dissipate the electric charge over a greater area of the composite structure 1, thereby reducing the likelihood of damage to a localized portion of the composite structure 1.

Still another advantage of the titanium particles 12 is that they may not tangibly increase the overall weight of the composite structure 1 due to the resultant gains in overall strength of the composite structure 1 under hot/wet conditions which may limit the performance envelope for polymer composite structures. Designs may be possible with fewer plies of prepreg (carbon fiber-epoxy) and still meet certain damage impact requirements. This may be particularly important in aerospace applications in which lightweight, yet structurally-strong components are highly important. Moreover, the use of titanium sponge particles in the matrix interlayer may not require significant modification to existing composite part fabrication processes where composite structures are formed using preimpregnated (prepreg) materials and are easily incorporated into advanced composite part fabrication processes not involving prepreg material forms [e.g. resin transfer molding (RTM), vacuum assisted resin transfer molded (VARTM), resin infusion, etc.].

The use of titanium particles 12 may be anticipated to provide significant resistance to impact damage of the composite structure 1. This is because titanium may be capable of absorbing a significant degree of impact and deformation due to its elongation properties. This may be anticipated to provide a significant load-velocity impact resistance. Titanium may also have significant vibration dampening properties that may help to improve the fatigue life of the composite structure, which may be an especially desirable characteristic for aircraft and spacecraft structures. The titanium particles may be able to dampen impact energies (i.e. shock) to protect against delamination of the independent plies of the composite structure and act as a vibration/shock energy absorber (i.e. sink) to help significantly dissipate impact energies experienced by the composite structure.

It will be appreciated that the quantity of titanium particles 12 by volume in the resin material 14 can vary significantly to suit the needs of a specific application. The resin matrix interlayer 8, 10 may comprise about 0.3%-30% particles by volume, but these particles may be utilized in significantly higher concentrations as a discontinuous, particle-rich layer approaching the morphology similar to a discrete, continuous metal ply as in fiber-metal laminates. Alternatively, a lesser concentration of the particles may be used to suit a specific application.

The use of titanium particles 12 may be predicted to provide a number of additional advantages such as good corrosion and wear (i.e, erosion) resistance relative to the base laminate. When it is added to a thermosetting polymer composite, titanium may improve the $G_{1c}/G_{11c}$ properties (i.e., mechanical properties reflecting fracture resistance) of the composite. The titanium particles 12 may also provide significantly improved electrical conductivity for the composite structure 1 to thus improve its durability relative to repeated Lightning strikes. The overall durability of the outer surface of the composite structure 1 may also be improved (i.e. regarding wear and erosion resistance).

Titanium sponge powder may have little impact on current manufacturing processes. More specifically, titanium sponge powder may not require significant modification to ATLM (Automated Tape Laying Machining), hot-drape forming, advanced fiber placement (AFP) and hand lay-up operations. The use of titanium sponge particles may also be readily applicable to Resin Transfer Molding (RTM), Vacuum Assisted Resin Transfer Molding (VARTM) and Seamann Composite's Resin Injection Molding Process (SCRIMP), where the titanium particles are added to the surface of the preform's fibers or partitioned between layers of the preform's plies prior to the resin impregnation process. Still another unique benefit to the use of particle-toughened composite structure may include its ability to be utilized in a form equivalent to prepreg materials currently used (i.e., unidirectional tape and fabric prepregs) without impacting current machine processes. The particle-toughened composite could possibly also act as a "drop-in" replacement for current materials used in such processes as Automated Tape Laying Machining (ATLM), advanced fiber placement (AFP), hot-drape forming and conventional hand layup. As will be appreciated, the use of titanium sponge particles within the interlayers of a composite structure may have significant specific advantages to aircraft structures. The vibration dampening characteristics of the titanium particles may significantly enhance the fatigue-life of aircraft structures. In space applications, in which stiff composite structures may be subjected to extreme acoustic and structural vibrations during launch, the particles may provide added protection against delamination and fracturing of the interlayers.

The utilization of titanium sponge particles as a resin matrix additive may provide the benefit of toughening the composite laminate, as well as providing additional performance benefits to the structure as was noted herein above. This metallic powder may provide benefits of upgrading strength qualities in existing lower cost epoxy systems, i.e. the 250 F cure systems, along with 350 F neat resin systems. There may be other possible beneficial uses such as, but not limited to, flame retardants; electronic heat sinks; ballistic protection; providing sound absorbing/barrier qualities; and raising the properties of high temperature epoxies, bismale-imide (BMI) and polymerization of monomeric reactants (PMR) polyimide monomers. The toughening system may not be limited to laminates with graphite/carbon fibers, as glass, aramid, and boron fibers, along with the possible use with thermoplastics [e.g. high-density polyethylene (HDPE), ultra high molecular weight polyethylene (UHMWPE), polyetheretherketone (PEEK), polyetherketoneketone (PEKK), etc.] may also be beneficial and functional. The particle additive may enable the practical use of titanium in composite materials and may further enable the composite material to serve as a "drop-in" material for current and advanced production processes in the manufacture of composite parts of various design complexities.

Figure 2:
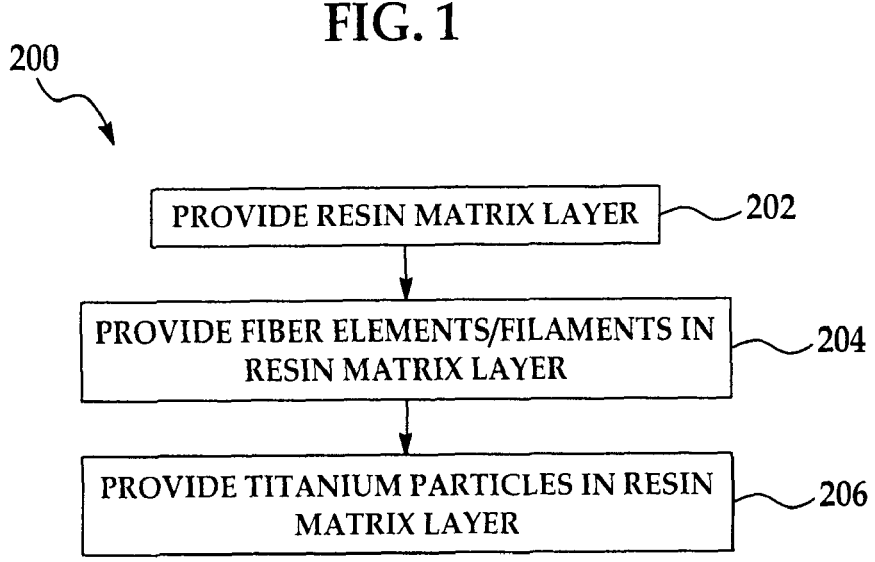
FIG. 2 is a flow diagram which illustrates an illustrative method of toughening a resin matrix interlayer.

Referring next to FIG. 2, a flow diagram which illustrates an illustrative method of toughening a resin matrix layer is shown. In block 202, a resin matrix layer having a resin material is provided. The resin material of the resin matrix layer may be epoxy, for example and without limitation. In block 204, fiber elements or filaments are provided in the resin material of the resin matrix layer. The fiber elements or filaments may be carbon fiber prepreg, for example and without limitation, and may be highly collimated unidirectionally in a tape form. In block 206, titanium particles are provided in the resin material of the resin matrix layer. The titanium particles may have a diameter of from about 1 to about 90 microns and may be present in the resin matrix layer in a quantity of about 0.3% to about 30% by volume. The titanium particles may be graded titanium sponge particles, for example and without limitation. In some applications, the titanium-strengthened resin matrix layer may be a resin matrix interlayer which bonds a first fiber layer to a second fiber layer in a polymer composite structure.

Figure 3:
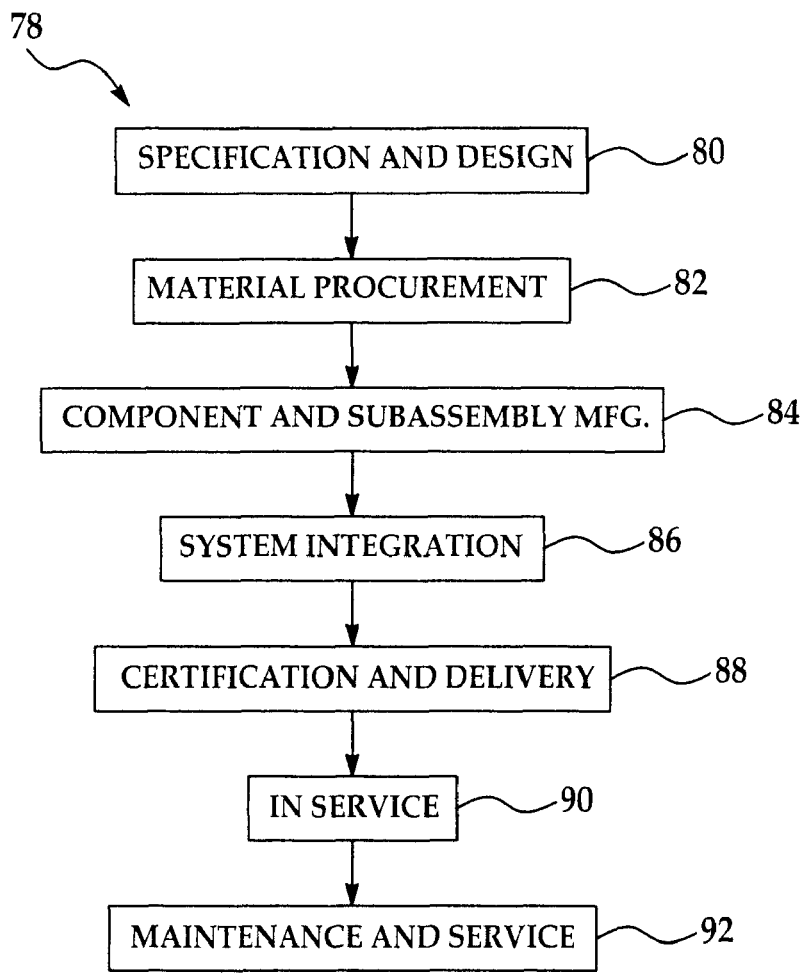
FIG. 3 is a flow diagram of an aircraft production and service methodology.
Figure 4:
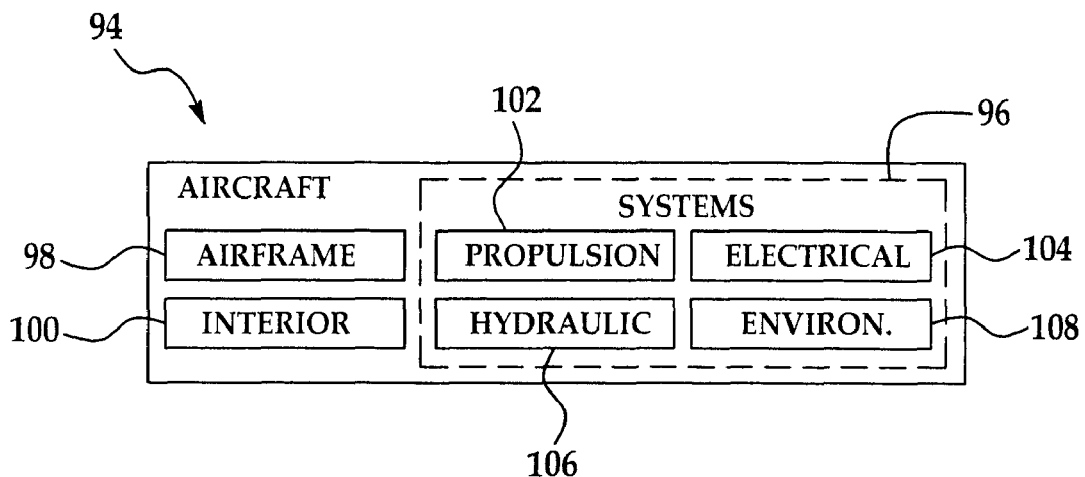
FIG. 4 is a block diagram of an aircraft.

Referring next to FIGS. 3 and 4, embodiments of the disclosure may be used in the context of an aircraft manufacturing and service method 78 as shown in FIG. 3 and an aircraft 94 as shown in FIG. 4. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 4, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of toughening a resin matrix layer, comprising:
   providing a resin matrix layer having a resin material;
   providing a plurality of fiber elements in said resin material of said resin matrix layer; and
   providing a plurality of titanium particles in said resin material of said resin matrix layer, said titanium particles comprising titanium sponge particles.

2. The method of claim 1 wherein said providing a resin matrix layer having a resin material comprises providing a resin matrix layer comprising epoxy.

3. The method of claim 1 wherein said providing a plurality of fiber elements in said resin material of said resin matrix layer comprises providing carbon fiber prepreg in said resin material of said resin matrix layer.

4. The method of claim 1 wherein said providing a plurality of titanium particles in said resin material of said resin matrix layer comprises providing a plurality of titanium particles in said at least one resin matrix layer in a quantity of from about 0.3% to about 30% by volume.

5. The method of claim 1 wherein said providing a plurality of titanium particles in said resin material of said resin matrix layer comprises providing a plurality of titanium particles having a diameter of from about 1 micron to about 90 microns in said resin material of said resin matrix layer.

6. The method of claim 1 wherein said titanium sponge particles are graded.

7. The method of claim 1 wherein said titanium particles are uniformly dispersed throughout said resin material.

8. The method of claim 1 wherein said resin matrix layer comprises a composite structure comprising an aircraft.

* * * * *